Figure 1:
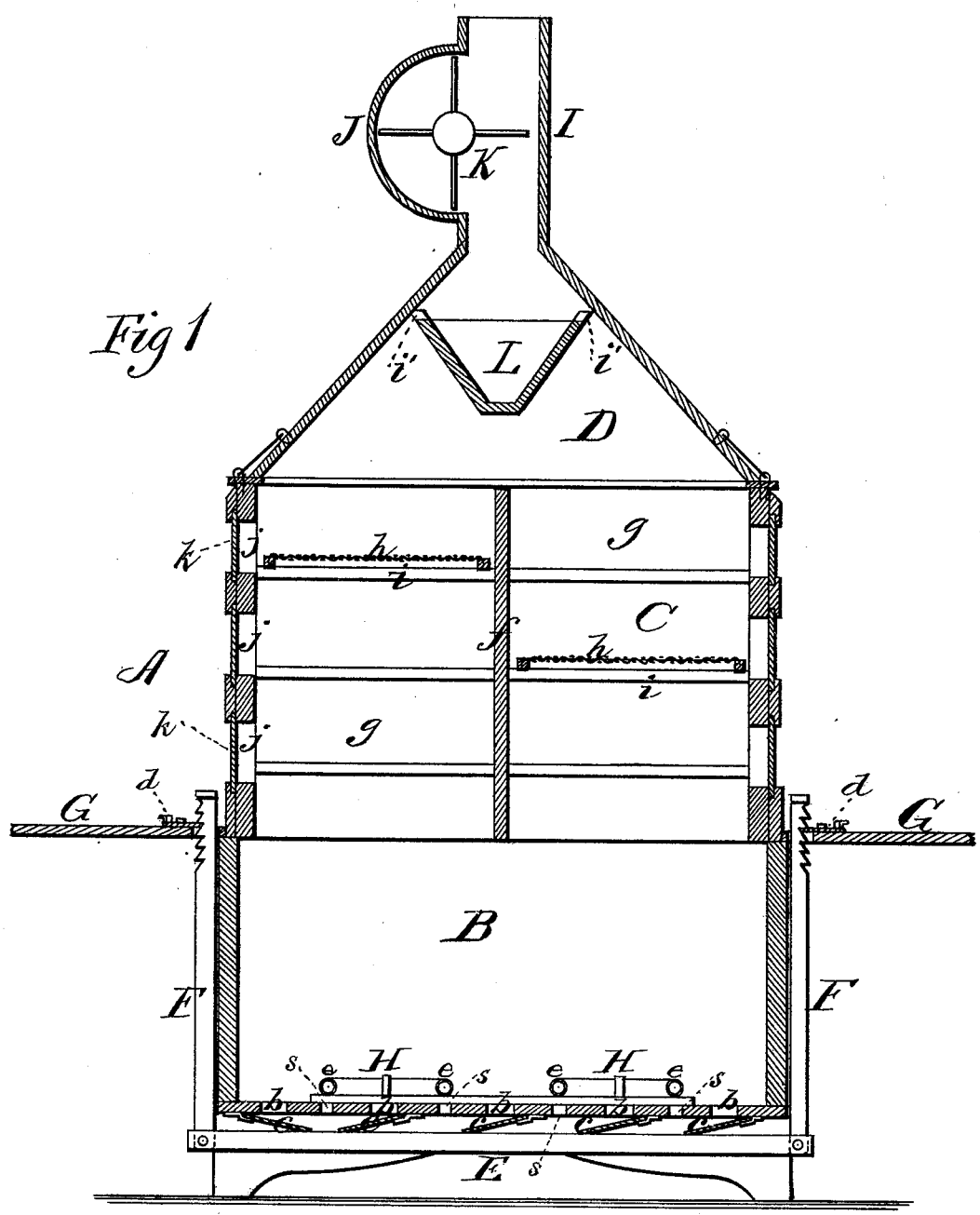

G. W. LEE & C. J. GEIGER.
DRIER.

No. 175,116. Patented March 21, 1876.

WITNESSES
Robert Everitt
Eugene Adamson

INVENTORS
Geo. W. Lee,
Conrad J. Geiger,
Chipman and Fosmer & Co.
ATTORNEYS

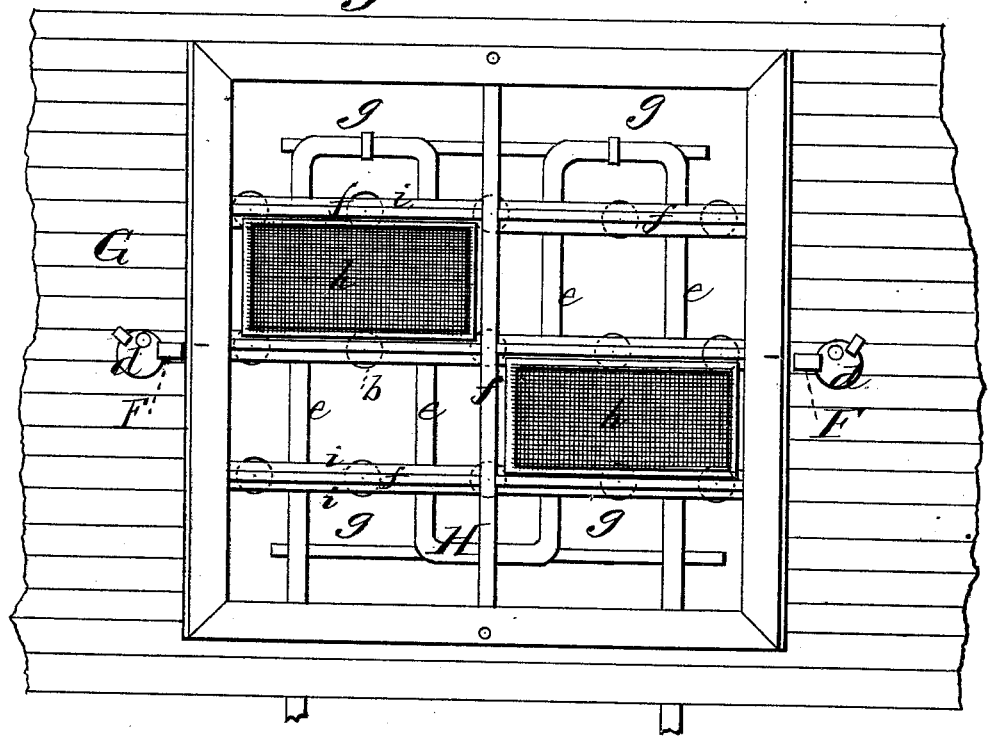

UNITED STATES PATENT OFFICE.

GEORGE W. LEE AND CONRAD J. GEIGER, OF ASHLEY, ILLINOIS.

IMPROVEMENT IN DRIERS.

Specification forming part of Letters Patent No. 175,116, dated March 21, 1876; application filed October 9, 1875.

*To all whom it may concern:*

Be it known that we, GEORGE W. LEE and CONRAD J. GEIGER, of Ashley, in the county of Washington and State of Illinois, have invented a new and valuable improvement in Glue and Fruit Evaporators; and we do hereby declare that the following is a full, clear, and exact description of the construction and operation of the same, reference being had to the annexed drawings, making a part of this specification, and to the letters and figures of reference marked thereon.

Figure 1 of the drawing is a representation of a vertical central section of our drier, and Fig. 2 is a plan view thereof.

This invention has relation to improvements in driers which are especially designed to be used for drying glue, fruits, and the like; and it consists in the arrangement and novel construction of the various devices used, whereby useful results are obtained, and fruit, glue, and other like substances requiring drying will be speedily deprived of their moisture, as will be hereinafter more fully explained.

In the annexed drawings, the letter A represents a drying-box consisting of three sections B C D, the first of which is a hot-air chamber, the second a receptacle for the fruit being dried, and the third a detachable tapering lid through which the vapors arising from the substance being dried will be allowed to escape into the open air. Chamber B is provided with a number of parallel slots, *s*, cut in its bottom, between which are made, also in the bottom, a number of perforations, *b*, of suitable size, the object of which is to regulate the degree of heat of the interior of the drier. Perforations *b* are closed at will by means of hinged boards *c* attached to the under side of the bottom in the following manner, to wit: A strong rod, E, of suitable material, is arranged transversely to the boards *c*, and is pivoted at each end to a metallic rack-bar, F, which extends upward through a platform, G, near the upper end of chamber B. When bars F are raised the rod E causes the doors *c* to be thrown upward in close contact with the bottom of the chamber, thus closing orifices *b*, and the said orifices are kept closed by means of a vibrating plate, *d*, which is thrust into engagement with rack-bar F, thereby preventing it from endwise displacement, and the consequent lowering of bar E and of boards *c*.

Slots *s*, before alluded to, are always open, and are situated each one directly under a pipe, *e*, of a coil of hot-air or steam pipes, H. Consequently, when orifices *b* are closed, all the air which enters the chamber must come in contact with the pipes *e*, and be thoroughly dried and heated before reaching the fruit in the receptacle C. This receptacle is divided, by means of partitions *f*, into a number of closets, *g*, to which access is had for the purpose of putting in fruit-trays *h*, or removing the same through openings *j* in the side, which are closed by means of air-tight sliding doors *k*. As shown in Fig. 1, the trays *h* are of suitable reticulated material, and are supported upon strips *i*, secured to the inside of the closets, so as to leave a space between each tray. Consequently, the heated air will permeate every part of the drier, subjecting all the fruit to its influence.

Chamber C is closed by a detachable tapering lid D having an eduction-tube, I, upon its upper end, which is provided with a case, J, within which is mounted in suitable bearings an exhaust-fan, K. This lid is also provided upon its interior with an inverted pyramidal deflector, L, narrow passages *i'* being left between it and the lid for the escape of the moisture-laden air into tube I, which deflector is intended to disseminate the hot air throughout the drier-chamber C, and to prevent its upward escape into the pipe I before being thoroughly charged with moisture drawn from the fruit or other articles being dried. The shaft of fan K is provided with a pulley-wheel, through which the fan is operated by any suitable motor to suck out the moisture-charged air from the drier and discharge it out of the open end of pipe I into the atmosphere. By this means the article being dried is subjected to constantly-renewed currents of dried and heated air, and will be speedily deprived of its watery parts and become desiccated.

What we claim as new, and desire to secure by Letters Patent, is—

1. In a drier, the hot-air chamber B, having orifices $b$ and hinged door $c$, in combination with the transverse bar E, rack-bars F, and locking-plates $d$, substantially as specified.

2. The chamber B, having parallel slots $s$, in combination with the steam-coil H, the pipes $e$ of which are directly over and in close proximity to the said slots, substantially as specified.

3. The tapering lid, having an inverted pyramidal deflector, L, in combination with the eduction-tube I and fan K, substantially as described, and for the purpose set forth.

In testimony that we claim the above we have hereunto subscribed our names in the presence of two witnesses.

GEORGE WASHINGTON LEE.
CONRAD JOHN GEIGER.

Witnesses:
D. A. CARSON,
C. B. GEIGER.